(12) United States Patent
Nitzschke et al.

(10) Patent No.: US 6,347,556 B1
(45) Date of Patent: Feb. 19, 2002

(54) 12-SPEED GEARBOX FOR UTILITY VEHICLES

(75) Inventors: Rüdiger Nitzschke, Langenargen; Bernd Schepperle, Konstanz, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/530,214

(22) PCT Filed: Nov. 30, 1998

(86) PCT No.: PCT/EP98/07652

§ 371 Date: Apr. 26, 2000

§ 102(e) Date: Apr. 26, 2000

(87) PCT Pub. No.: WO99/30063

PCT Pub. Date: Jun. 17, 1999

(30) Foreign Application Priority Data

Dec. 4, 1997 (DE) .......................... 197 53 728

(51) Int. Cl.[7] .......................... F16H 59/00; F16H 61/00; F16H 63/00
(52) U.S. Cl. .......................... 74/335; 74/336 R
(58) Field of Search .............................. 74/335, 336 R, 74/325, 334

(56) References Cited

U.S. PATENT DOCUMENTS

| | | | |
|---|---|---|---|
| 3,396,610 A | 8/1968 | Rich, Jr. et al. | 74/740 |
| 4,133,219 A | * 1/1979 | Kelbel et al. | 74/476 |
| 5,809,835 A | * 9/1998 | Beim et al. | 74/335 |

FOREIGN PATENT DOCUMENTS

| | | |
|---|---|---|
| EP | 0 532 924 A2 | 3/1993 |
| EP | 0 737 828 A1 | 10/1996 |
| EP | 0004361 | * 10/1997 |
| WO | 86/03858 | 7/1986 |
| WO | 90/15272 | 12/1990 |
| WO | 94/10484 | 5/1994 |

* cited by examiner

*Primary Examiner*—Sherry Estremsky
*Assistant Examiner*—Tisha D. Lewis
(74) *Attorney, Agent, or Firm*—Davis & Bujold, P.L.L.C.

(57) ABSTRACT

For a 12-speed transmission for utility vehicles in 2×3×2 construction, a shift lever (1) is proposed which is configured as a universal joint with a shift fork (2) and a reversing lever (3). The shift fork is supported pivotally jointly with the transmission while the reversing lever (3) is pivotally mounted on the shift fork. When the shift fork is actuated, the synchronization movement, which occurs upon engagement in a synchronization block, runs in opposite direction, when the reverse lever is shifted in the same direction. This makes it possible to shift through the six speeds of the main gear in one stroke with successive shift movements in opposite direction.

8 Claims, 5 Drawing Sheets

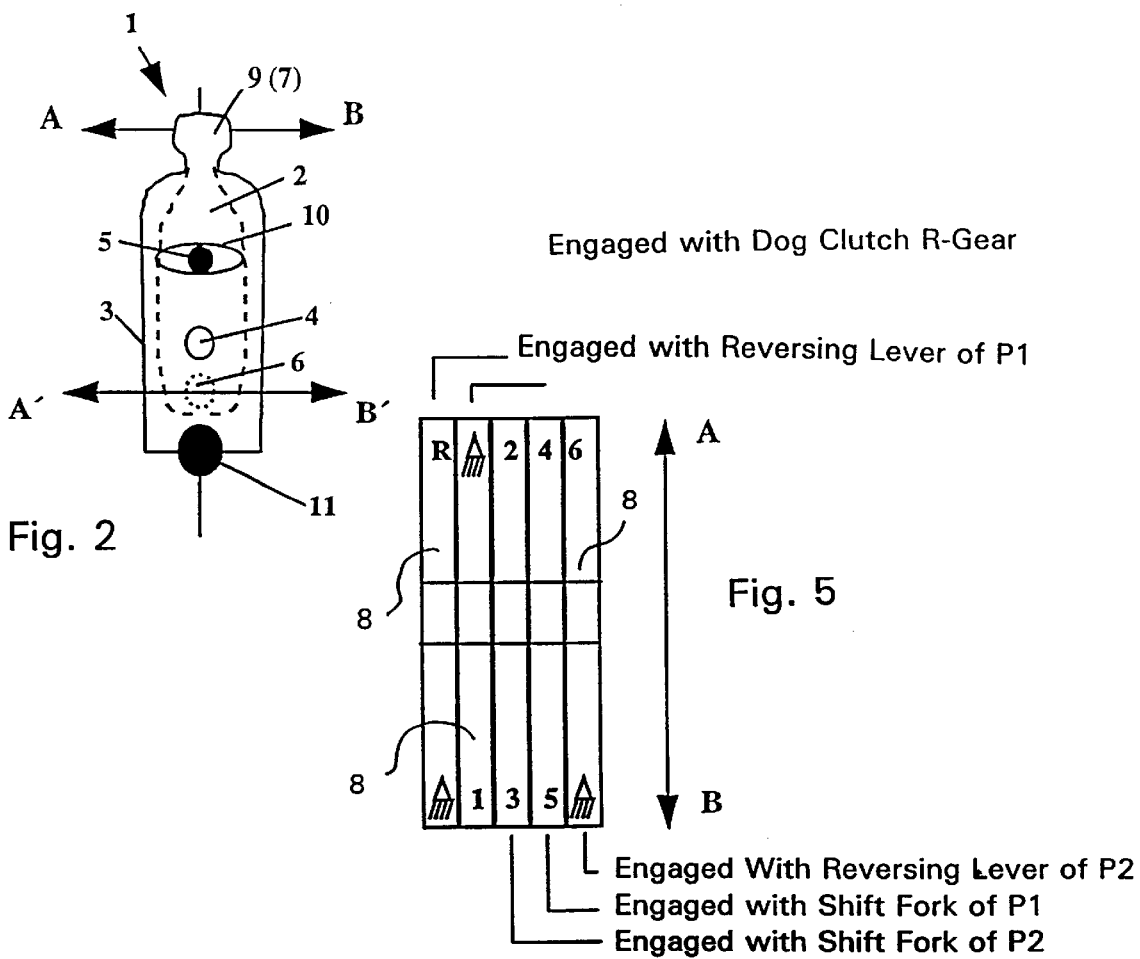
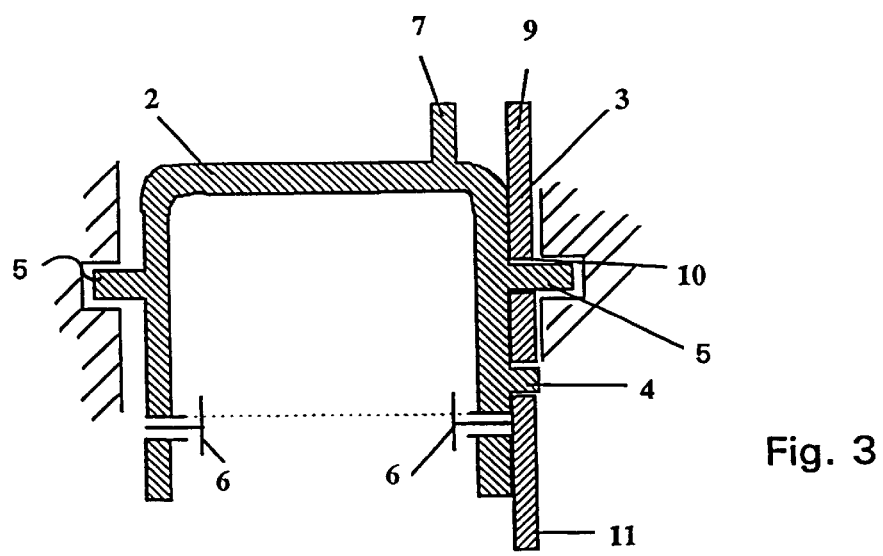

— Engaged with Reversing Lever of P1 and P2
— Engaged with Shift Fork of P2
— Engaged with Shift Fork of P1

12-SPEED GEARBOX FOR UTILITY VEHICLES

The invention relates to a 12-speed transmission for utility vehicles in 2×3×2.

BACKGROUND OF THE INVENTION

Such transmissions usually have a pneumatically actuated front-mounted or split section, a 3-speed main gear and a pneumatically actuated rear-mounted or range section. For the main gear, a shifting device is provided which has shift rails on which shift levers are assembled which access synchronization blocks between the individual gear steps of the main gear. The shifting device is often analogous to shifting devices of 16-speed transmissions whereby an unfavorable gear shift diagram results in which the gears are not continuously shifted by a single stroke in alternating shifting directions, but on the contrary there remains, in the gear shift diagram of the course of the six gears to be shifted, a blank lying between the second and fifth gears. After the third gear, the shift lever is not passed in one stroke precisely to the fourth gear, but again must be drawn through the idling speed position in the same direction as the third gear. Only then can the fifth gear be shifted from the fourth gear in one stroke.

The problem on which the invention is based is to modify a 12-speed transmission for utility vehicles so that a shift of the main gear is possible in one stroke.

SUMMARY OF THE INVENTION

Accordingly, each shift lever otherwise actuated by the shift rail and which engages in the synchronization block of the transmission is replaced by a universal joint connection consisting of a shift fork and a reversing lever wherein the shift fork is supported fixed to the housing and shift fork and reversing lever are each actuated by their own shift rail. An engagement in the synchronization block, via a reversing lever, occurs when actuating the reversing lever in the same direction, when actuating the shift fork an opposite direction. The synchronization blocks of the transmission are then actuated either with the reversing lever or with the shift fork so that it becomes possible completely to shift the transmission in one stroke.

In such a design of the 12-speed transmission, optionally more than two gears can be shifted, via a shift rail, e.g. gears 4, 5 and 6. Thereby the shift rail engages in both synchronization blocks of the main gear. In order not to shift two gears simultaneously, the support points of the reversing lever are changed. In this case, the lever, not supported at the time, performs an idle movement. The support points are either mechanically or mechanically/pneumatically installed, according to the rotary shaft position, the support points being installed without force. Based on the chosen systematics of the shifting operation of the transmission, the support points are already brought to their place prior to the supporting operation so that no force is needed for this. Only when withdrawing the support points when shifting some gears is a very slight disengaging force required.

Consisting of a shift fork and reversing lever pivotally supported thereon, the selected construction of the individual shift levers makes different constructions of the transmission possible. Between the first and second gears, the transmission thus can have the same as, between the second and third gears, a respective synchronization block in which the shift fork or the reversing lever engage. A complete shift of the transmission in one stroke is also possible in a construction having synchronization blocks between the first and the reverse gear, the same as between the second and third gears. This is possible by implementing a reversal of the shifting device of the upper section of the transmission by the shift forks combined with reversing levers.

BRIEF DESCRIPTION OF THE DRAWINGS

The invention is explained in detail by embodiments with the aid the drawings. The drawings show:

FIG. 2 is a shift lever in combination with a shift fork and a reversing lever, according to the invention;

FIG. 3 is a view of the shift lever, according to FIG. 2;

FIG. 5 is a diagrammatic representation of the shift rails and of the engagements of shift fork and reversing lever in synchronization blocks of the transmission;

DESCRIPTION OF THE PREFERRED EMBODIMENT

Figure 1A:
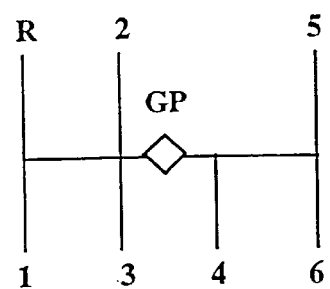
FIGS. 1A to IC are the customary gear shift diagrams of a 2-speed transmission and two desired gear shift diagrams.
Figure 1B:
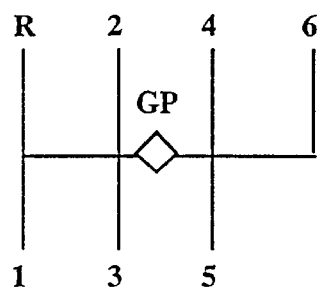
Figure 1C:
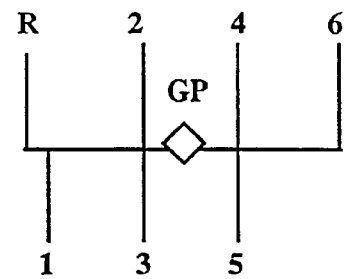

In FIG. 1A, the gear shift diagram of a conventional 12-speed transmission of a 2×3×2 construction is diagrammatically shown. It can be seen that between the second and fifth gears a shift blank prevails and the transmission cannot be shifted through in one stroke. Desired gear shift diagrams are shown in FIGS. 1B and 1C; in the case of FIG. 1B, the gear shifts run in respective alternating shift directions in one stroke from gear 1 to gear 6. In this case, the reverse gear is directly opposite to the first gear. Likewise, according to FIG. 1C, the gear shift diagram allows a complete shift of the transmission from the first to the sixth gear in alternating shift movements, the reverse gear being offset relative to the first gear.

GP designates the rear-mounted or range section which allows splitting the three gears of the main gear to provide six gears.

Figure 4:
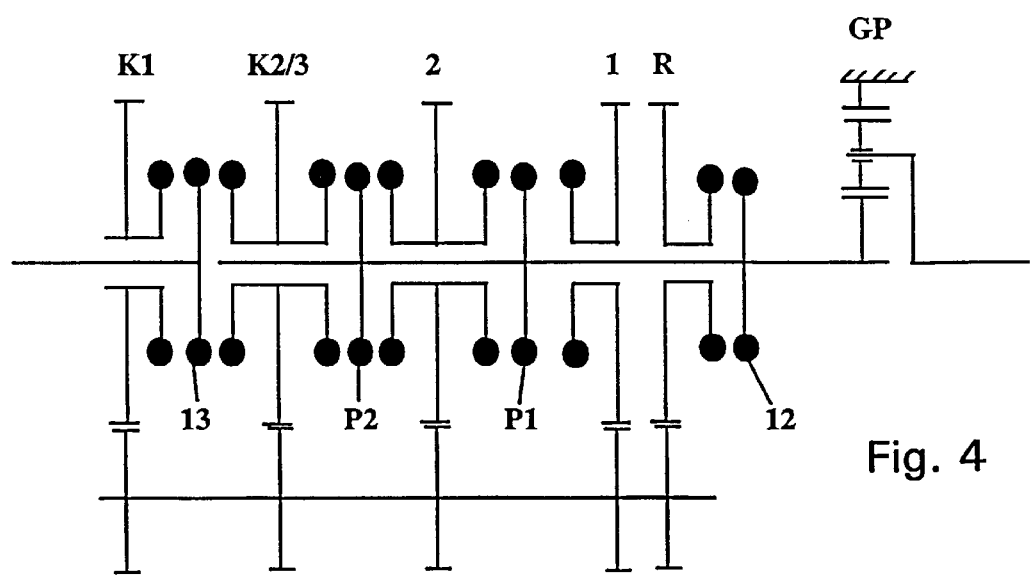
FIG. 4 is the construction of a 12-speed transmission for a shift lever, according to the invention.

In FIGS. 2 and 3, a shift lever 1 is shown with which it is possible to shift through the transmission using one stroke. The shift lever 1 consists of a shift fork 2 and a reversing lever 3 which is pivotally supported about an axle 4 of the shift fork 2. According to FIG. 3, the U-shaped shift fork 2 is supported and fixed to the housing by an axle 5 above and parallel with the axle 4 and engages at its lower end across the axle 4 at 6 in a synchronization block P1 or P2 of the transmission (FIG. 4). The shift fork 2 has at its upper end a stud 7 controlled by a shift rail 8 (FIG. 5) of the shifting device. The reversing lever 3 has, likewise at its upper end adjacent to the stud 7 of the shift rail, a stud 9 also controlled by a shift rail 8. The axle 5 fixed to the housing encompasses the reversing lever 3 with an oblong hole 10 so that it swings in both directions around the axle 4 and can engage by its lower area in a synchronization block of the transmission. The reversing lever 9 is pivotally supported by its lower end, via an axle 11, fixed to the housing or an adequate support. One such shift lever is provided for each synchronization block of the transmission.

If the shift fork is moved in direction A, the synchronization unit of the synchronization block is shifted in direction B'. If the reversing lever is moved in direction A, the synchronization unit is shifted in direction A'. This means that, upon actuation of the shift fork, the synchronization movement is in an opposite direction and upon a movement of the reversing lever, it is in the same direction.

According to FIG. 4, the shift forks can be used now only in combination with a transmission by connecting, between the first and second gears, one synchronization block P1 and, between the second and third gears, one other synchronization block P2 in which respectively engage the reversing lever and the shift fork of the two shift levers. The shift direction of the upper section is reversed by the universal joint construction of shift fork and reversing lever, it is possible in this transmission, according to FIG. 2, to shift the second gear from both sides. For the reverse gear R, a dog clutch 12 is provided. Additionally, two steps K1 and K2 of the front-mounted or split section with the synchronization unit 13 and the rear-mounted or range section GP are shown. The shift directions A and B, which coincide with those of FIG. 2, are also plotted.

In FIG. 5 is diagrammatically shown the arrangement of the shift rails 8. Here one shift rail of the upper section is provided for the reverse gear and one shift rail is provided for the second, fourth and sixth gears, respectively. For the lower section, three shift rails are provided for the gears 1, 3 and 5. Likewise above the shift rail between the reverse gear and the second gear, the two outer shift rails of this section are locked. For the reverse gear, the left shift rails engages with the dog clutch 12. For the first gear, the second shift rail engages with the reversing lever on the synchronization block P1. The third shift rail for the second and third gears engages with the shift fork on the block P2. The fourth shift rails for the fourth and fifth gears engages in the shift fork on the first synchronization block P1 and for the sixth gear the reversing lever engages on the synchronization block P2 in the shift rail to the right. Thus, all six gears can be completely shifted in one stroke in respective opposite movements.

Figure 6:
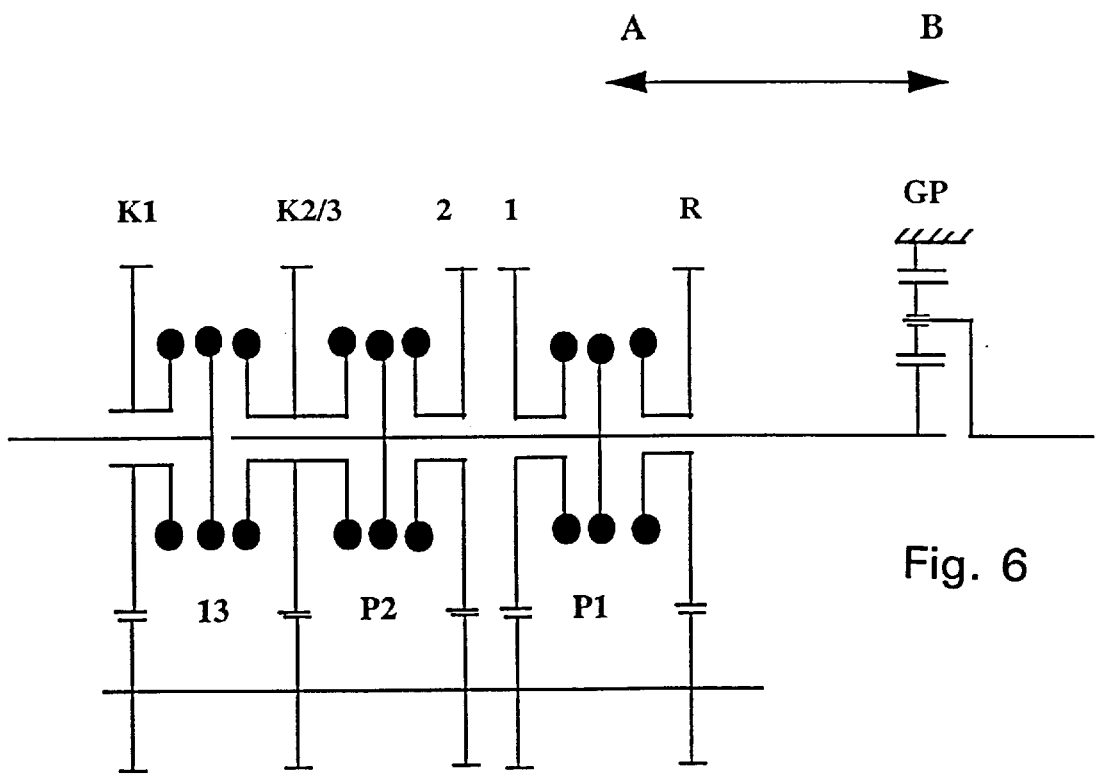
FIG. 6 is a diagrammatic representation of modified construction of a 12-speed transmission for shift levers, according to the invention.

In FIG. 6 is shown a modified transmission where the synchronization block P1 is placed between the reverse gear and the first gear and the synchronization block P2 between the second and third gears. The split section and also the range section GP are constructed the same as in the transmission according to FIG. 4.

Figure 7:
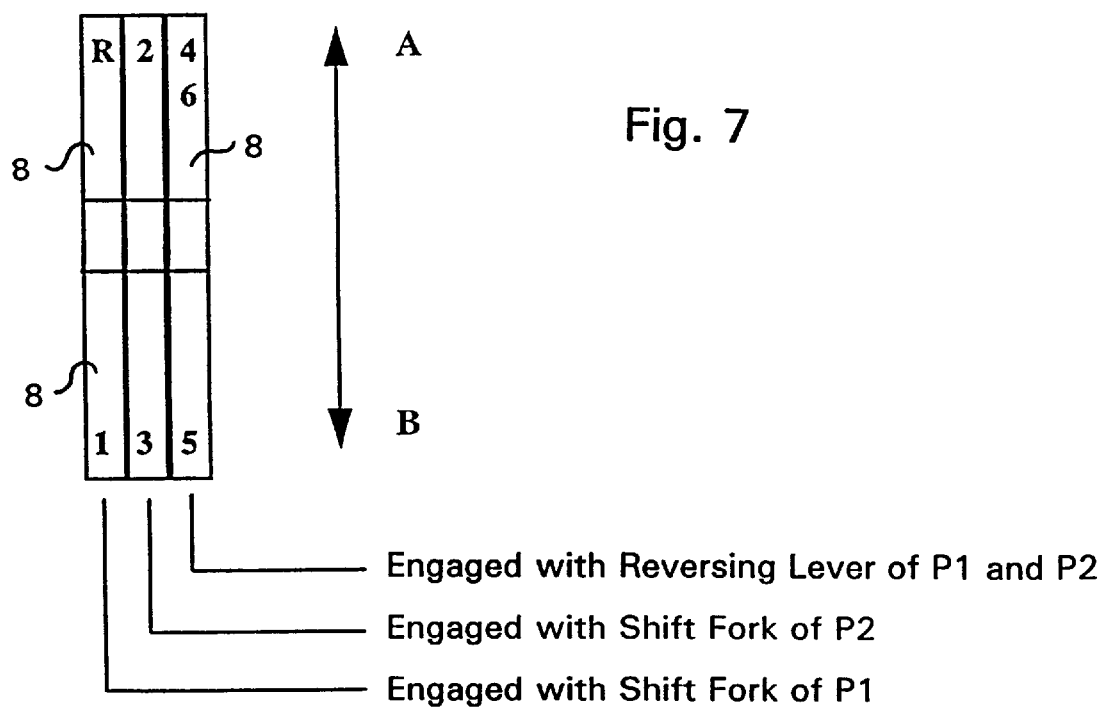
FIG. 7 is a diagrammatic representation of the shift rails and of the engagements of reversing lever and shift fork in the synchronization blocks of the transmission.
Figure 8A:
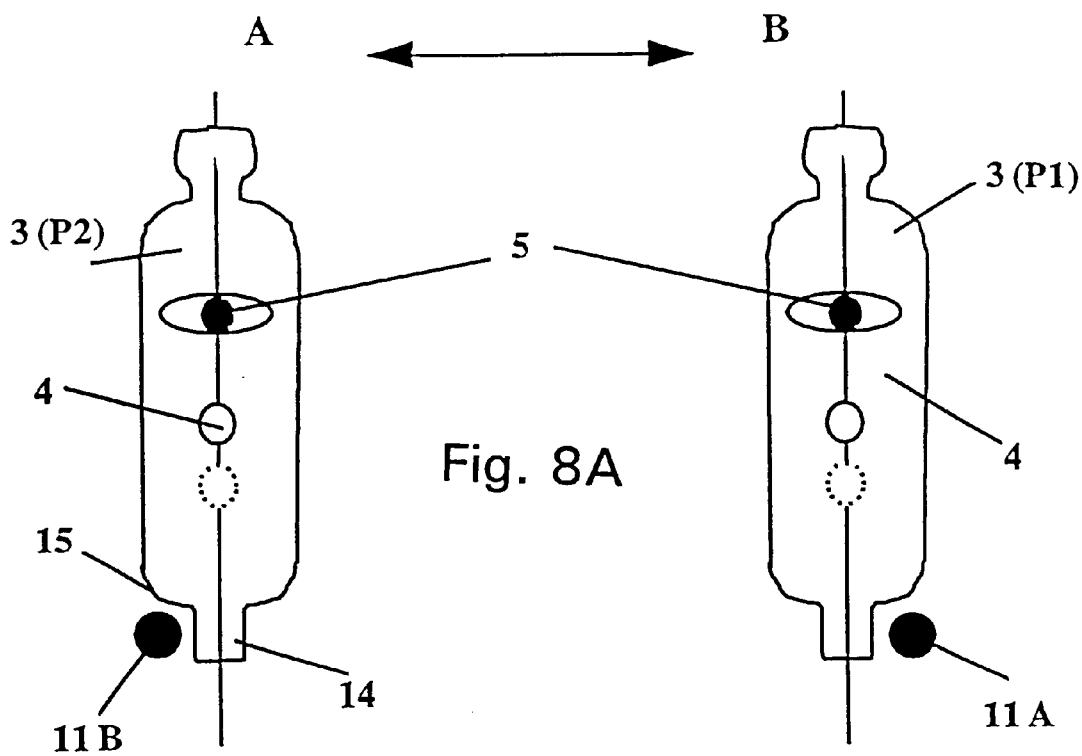
FIGS. 8A to 8D are diagrammatic representations of the movements of shift rails and reversing levers and of the support points for the reversing lever.
Figure 8B:
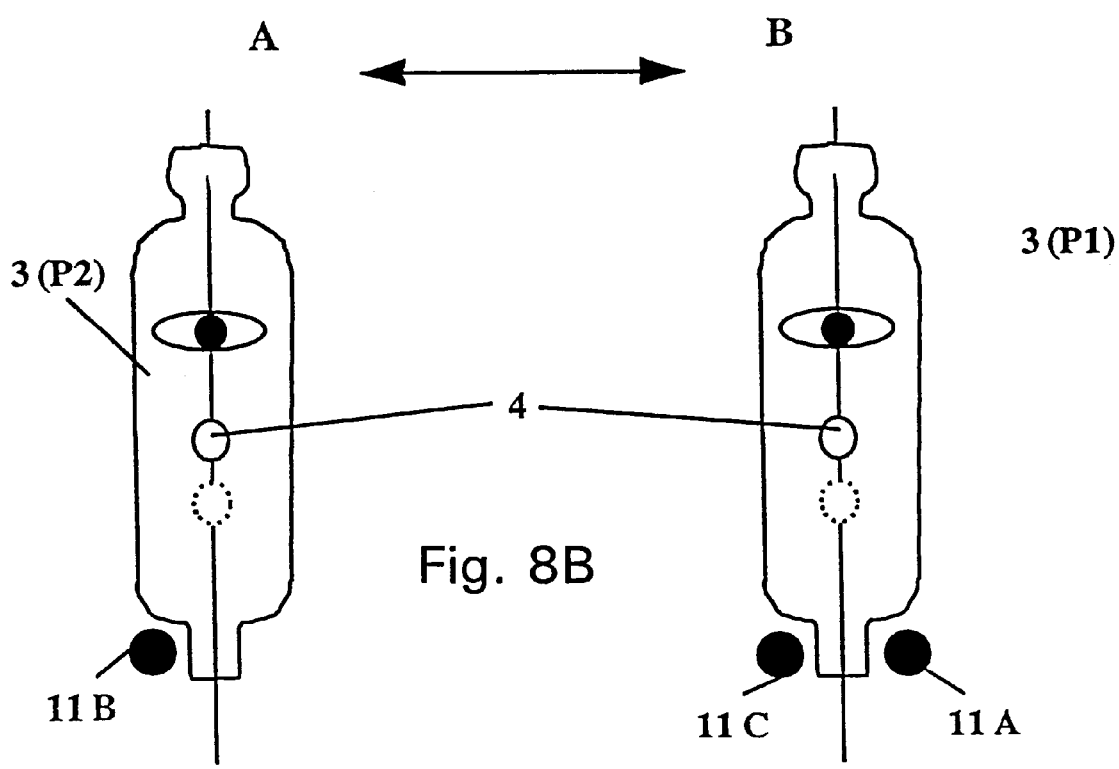
Figure 8C:
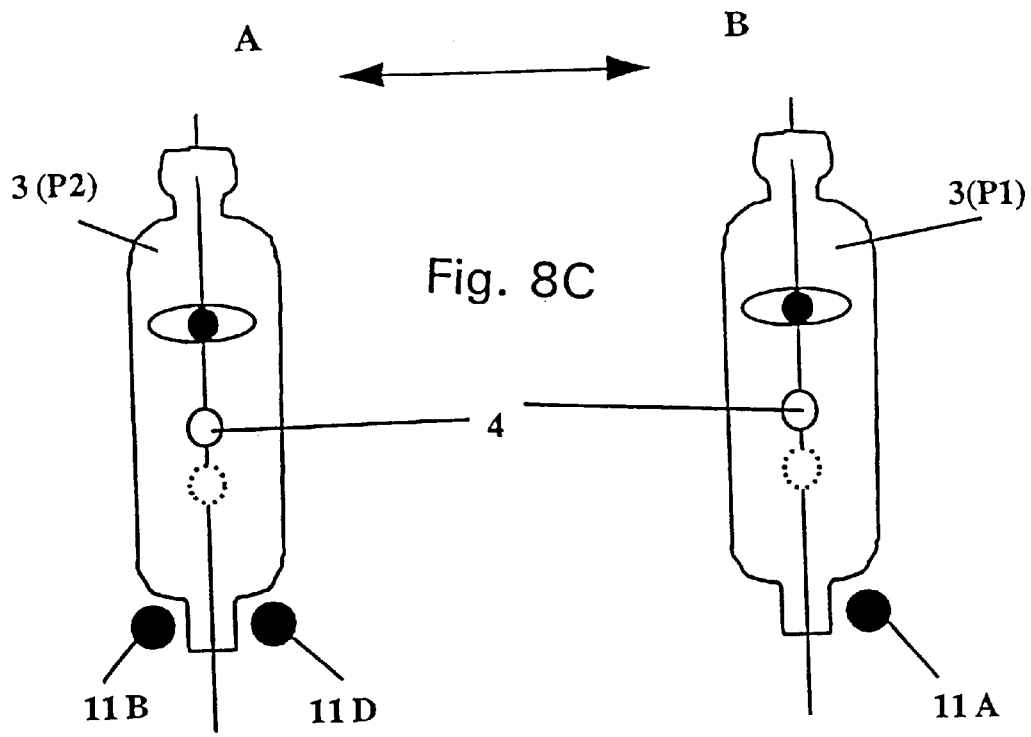
Figure 8D:
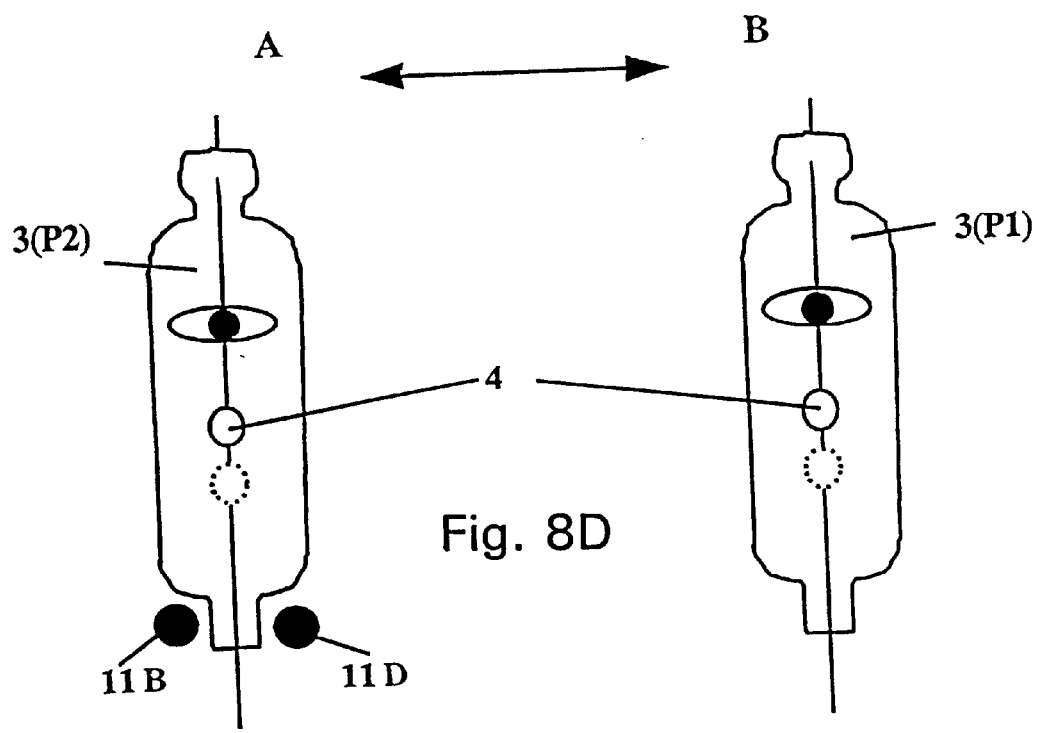

In FIG. 7 is shown the shift rail arrangement for this transmission according to FIG. 6. Three shift rails are here provided for the upper and lower sections wherein an engagement of the shift fork in the block P1 exists via the shift rail for the first and the reverse gears. For the shift rail of the second and third gears, there is an engagement of the shift fork on the P2 block and for the shift rails of the gears 4, 5 and 6 an engagement of the reversing lever in the blocks P1 and P2. In order not to shift simultaneously in this construction two gears for the gears 4, 5 and 6, the lower support point for the reversing lever is changed. For the purpose the reversing lever has on its lower end a lug 14 so that it can support itself on both sides with the lug and a lower curved area 15. This applies only to the upper section, while in the lower section, the support points of both reversing levers can be omitted. In the upper section, the support points are installed according to the following diagram:

In FIGS. 8A to 8D, the shift levers 3 for the first and second synchronization blocks P1 and P2 with the shift directions A and B are shown, respectively. To dial in the gate between the gears 4 and 5, two outer support points 11A and 11B, respectively, for the reversing lever of the synchronization block P1 and the reversing lever 3 for the synchronization block P2 are set up, as shown in FIG. 8A. When shifting to the fourth gear, an inner support point 11C for the reversing lever 3 for the block P1 is set up (FIG. 8B), when shifting to the fifth gear an inner support point 11D for the reversing lever 3 for the block P1 is set up (FIG. 8C), while the selection in the gate 6 is made possible by setting up the outer and inner support points 11B and 11D for the reversing lever 3 for the second synchronization block P2 (FIG. 8D). During the shift movements, the reversing lever, not supported at the time, effects an idle movement.

As mentioned above, the support points are mechanically or mechanically/pneumatically set up in accordance with the rotary shaft position. Thus a force free and front running set up of the support points is possible by the selective movement where by the desired 12-speed gear shift diagram likewise results.

REFERENCE NUMERALS

1 shift lever
2 shift fork
3 reversing lev
4 axle in 2
5 axle
6 engagement point
7 stud
8 shift rail
9 stud
10 oblong hole
11A–11D support points
12 dog clutch
13 synchronization of the split seated
14 lug
15 curved area
P1, P2 synchronization blocks
R reverse gear
K1, K2 shift steps of the split section
GP rear-mounted or range section

What is claimed is:

1. A 2×3×2-style 12-speed transmission for a utility vehicle, the 12-speed transmission having one of a pneumatically operated front group and a split group, a 3-speed main gear and one of a pneumatically operated downstream group and a range group (GP), the 12-speed transmission having a device comprising a plurality of shift rails (8) which are used to control a plurality of shift levers (1) for accessing synchronizing assemblies (P1, P2) of the 12-speed transmission;

wherein each of the plurality of shift levers (1) is a universal joint comprising a shift fork (2) and a reversing lever (3), and each of the plurality of shift levers (1) is controlled by a separate shift rail (8), each of the separate shift forks (2) is capable of swinging between an axle (4) of the universal joint and the shift rail about a fixed housing axle (5), a first end of each of the plurality of shift forks (2) communicates with one of the shift rails (8) via a stud (7) and a second end of each one of the shift forks (2) communicates with a synchronizing assembly (P1, P2) of the transmission, and a first end (9) of each one of the reversing levers (3) is controlled by one of the plurality of shift rails (8) and, a second end of each one of the reversing levers (3) is capable of swivelling about a fixed housing support point (11) and is rotatably supported against one of the plurality of shift fork (2) between the second end and the housing-fixed axle (5).

2. The transmission according to claim 1, wherein the fixed housing support point (11) for the reversing lever (3) is variable (11A, B, C, D).

3. The transmission according to claim 1, wherein a first synchronizing assembly (P1 or P2) is located between a first gear and a second gear of the transmission, and a second synchronizing assembly (P2 or P1) is located between the second gear and a third gear of the transmission, and each one of plurality of shift forks (2) and the plurality of reversing levers (3) engages with the first and second synchronizing assemblies (P1, P2).

4. The transmission according to claim 1 wherein a first synchronizing assembly (P1 or P2) is located between a reverse gear (R) and a first gear of the transmission, and a second synchronizing assembly (P1 or P2) is located between the second gear and a third gear of the transmission, and each one of plurality of shift forks (2) and the plurality of reversing levers engage with the first and second synchronizing assemblies (P1, P2).

5. The transmission according to claim 2, wherein a first synchronizing assembly (P1 or P2) is located between a first gear and a second gear of the transmission, and a second synchronizing assembly (P2 or P1) is located between the second gear and a third gear of the transmission, and each one of plurality of shift forks (2) and the plurality of reversing levers (3) engages with the first and second synchronizing assemblies (P1, P2).

6. The transmission according to claim 2, wherein a first synchronizing assembly (P1 or P2) is located between a reverse gear (R) and a first gear of the transmission, and a second synchronizing assembly (P1 or P2) is located between the second gear and a third gear of the transmission, and each one of plurality of shift forks (2) and the plurality of reversing levers engage with the first and second synchronizing assemblies (P1, P2).

7. A 12-speed transmission, for a utility vehicle, with a 2×3×2 construction having a pneumatically actuated split section, a 3-speed main gear and a pneumatically actuated range section (GP), a shifting device comprising a plurality of shift rails (8) by which a plurality of shift levers (1) for accessing synchronization blocks (P1, P2) are controlled, wherein each of the plurality of shift levers (1) is a universal joint comprising a shift fork (2) and a reversing lever (3), and each of the plurality of shift levers (1) is controlled by a respective shift rail (8), each shift fork (2) is pivotally mounted via an axle (4) of the universal joint and a shift rail axle (5) fixed to the housing, and one end of each shift fork (2) is connected to the shift rail (8) and at an opposite end of each shift fork (2) is connected to one of the synchronization blocks (P1 or P2), and one end (9) of each reversing lever (3) is controlled by one of the plurality of shift rails (8) and an opposite end of each reversing lever (3) is tiltable about a support point (11) fixed to the housing and is rotatably supported to the shift fork (2) between the second end and the axle (5) fixed to the housing; and one of the synchronization blocks (P1 or P2) is located between a first gear and a second gear and a second one of the synchronization blocks (P1 or P2) is located between a second gear and a third gear which engage with the plurality of shift forks (2) and the plurality of reversing levers (3).

8. A 12-speed transmission, for a utility vehicle, with a 2×3×2 construction having a pneumatically actuated split section, a 3-speed main gear and a pneumatically actuated range section (GP), a shifting device comprising a plurality of shift rails (8) by which a plurality of shift levers (1) for accessing synchronization blocks (P1, P2) are controlled, wherein each of the plurality of shift levers (1) is a universal joint comprising a shift fork (2) and a reversing lever (3), and each of the plurality of shift levers (1) is controlled by a respective shift rail (8), each shift fork (2) is pivotally mounted via an axle (4) of the universal joint and a shift rail axle (5) fixed to the housing, and one end of each shift fork (2) is connected to the shift rail (8) and at an opposite end of each shift fork (2) is connected to one of the synchronization blocks (P1, P2), and one end (9) of each reversing lever (3) is controlled by one of the plurality of shift rails (8) and an opposite end of each reversing lever (3) is tiltable about a support point (11) fixed to the housing and is rotatably supported to the shift fork (2) between the second end and the axle (5) fixed to the housing; and one of the synchronization blocks (P1 or P2) is located between a reverse gear (R) and a first gear and a second one of the synchronization blocks (P1 or P2) is located between a second gear and a third gear which engage with the plurality of shift forks (2) and the plurality of reversing levers (3).

* * * * *